Sept. 17, 1957 W. KOCH 2,806,984
SELENIUM RECTIFIERS AND PROCESS FOR MANUFACTURING SAME
Filed Feb. 6, 1956
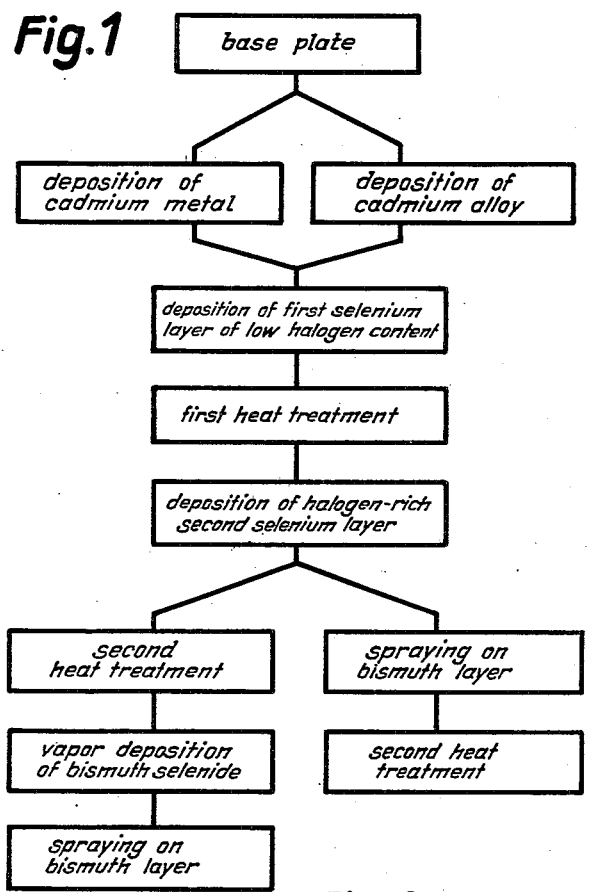
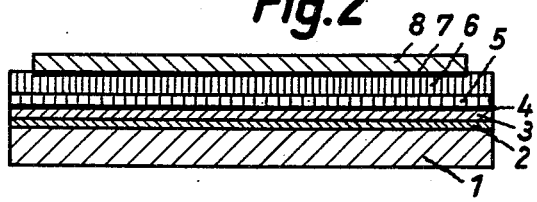
Inventor:
WERNER KOCH
By Taukmin & Taukmin
Attorneys

2,806,984

SELENIUM RECTIFIERS AND PROCESS FOR MANUFACTURING SAME

Werner Koch, Belecke, Mohne, Germany, assignor to Licentia Patent-Verwaltungs-G. m. b. H., Hamburg, Germany Application February 6, 1956, Serial No. 563,747

Claims priority, application Germany February 7, 1955

17 Claims. (Cl. 317—241)

This invention relates to a process for manufacturing selenium rectifiers.

It is an object of my invention to provide a new process for manufacturing selenium rectifiers which have particularly favorable properties with regard to current flow and blocking effects.

It is another object of the invention to provide a new process for manufacturing selenium rectifiers having at least two successive selenium layers of different impurity content which is substantially undisturbed by a distant heat treatment of each layer.

It is a further object of the invention to provide a new process for manufacturing selenium rectifiers having a coarse, crystalline, selenium layer of determined thickness and flow resistance.

It is yet another object of the invention to provide a new process for manufacturing selenium rectifiers having a coarse, crystalline, selenium layer, whereby further layers may be superimposed upon the coarse crystalline layer without changing the properties of the latter.

It is well known in the art of manufacturing selenium rectifiers to superimpose upon a base plate a number of selenium layers and to subject the latter to a thermal treatment in order to impart to the selenium a structure suitable for rectifying purposes.

It is also known to superimpose upon a base electrode two or more selenium layers of different conductivity and to subject these layers to a subsequent thermal treatment in two or more steps, the first of which steps consists in a heat treatment at temperatures between 80 and 130° C., while the second heat treatment is carried out at a temperature between 180° C. and a temperature just below the melting point of selenium (it being the intention to impart by this two-step thermal treatment, a coarser crystalline structure to the selenium surface so as to increase the blocking effect of the rectifier).

It is customary to build such rectifiers in a timely order of applying to the base electrode, with or without interposing an intermediary layer, for instance, of bismuth metal to suppress the formation of a blocking or barrier layer, one or several selenium layers simultaneously or successively, to subject these selenium layers either concurrently or after applying each partial layer to one or several new treatments, and finally to spray on the counter electrode consisting of cadmium.

Furthermore, it is well known that selenium to be used as a semi-conductor requires a heat treatment for developing its electrical and, in particular, its rectifying properties.

This heat treatment brings about a formation of individual crystallites which are constantly increasing in size with the length of the heating time and with increasing temperatures. This crystal growth is initially accompanied by a reduction of the resistivity of the material; however, after temperature has increased above a critical limit specific to the material, resistivity increases again. Therefore, in order to achieve a satisfactory blocking effect, all known processes provide for a heat treatment of the uppermost selenium layer adjacent the counter electrode at the highest admissible temperatures, because the resulting coarsely crystalline structure of this uppermost layer leads to a particularly high resistivity and consequently favorably influences the blocking effect. However, while the thickness of the coarse crystalline layer need only be very small for the desired purpose, the above-described conventional heat treatment unavoidably subjects the selenium layers below the uppermost layer to increased temperatures and thus imparts to them also a coarser crystalline structure and consequently a high blocking resistance which is undesirable in view of the fact that these layers are not to participate in the blocking effect. Moreover, the direction of current flow is thus undesirably influenced.

A further drawback of these conventional methods resides in the following: It is possible to superimpose several layers of selenium, each of which has a different content of impurities such as halogen atoms and the like. These layers are usually disposed in such order that the selenium layer adjacent the counter electrode is kept substantially free from these impurities while the successively deeper layers have higher contents of impurities. When the uppermost layer is subjected to the required above-described heat treatment, diffusion of the impurities from the lower layers into the uppermost layer are unavoidable, whereby the desired high resistivity of the uppermost layer is reduced while, at the same time, the migration of the impurities atoms out of the lower layers undesirably increases the activity of the latter. These drawbacks cannot be avoided in the known processes because the thermic formation at higher temperatures which, in particular, determines the properties of the uppermost selenium surface to be covered later by the counter electrode, must of necessity be carried out after the entire selenium layers have been mounted.

These drawbacks are avoided and the above-stated objects attained by the method of my invention which is based on my discovery that it is advantageous to build up the rectifier by superimposing layers beginning with what is conventionally the counter electrode, which thus becomes the base plate, while the first layer to be superimposed upon this base plate of "counter electrode" material is the substantially impurity-free selenium layer which is to be given coarse crystallinity and thus becomes the blocking layer, or barrier layer.

Upon this layer there are subsequently superimposed at least one or more selenium layers of higher impurity content and finally an electrode substantially free from blocking layers.

A preferred type of rectifier manufactured by the method according to my invention thus comprises a metal base plate, a layer of cadmium or a cadmium alloy on this base plate, a selenium layer poor in halogen adjacent the cadmium layer with an intermediary cadmium selenide layer therebetween, then a selenium layer richer in halogen, an intermediary layer of bismuth selenide, and finally a bismuth electrode.

Fig. 1 is a flow sheet showing the various steps required for making selenium rectifiers by the method according to the invention; and Fig. 2 is a schematic cross-sectional view of a selenium rectifier built according to the invention.

In accordance with the flow sheet of Fig. 1, a metal base plate is used which consists of a material which is a good conductor of electricity and heat, such as for instance, aluminum, nickel or a nickel-coated metal such as nickel-coated iron. Upon this base plate there is first applied a layer of cadmium metal or of a cadmium alloy whose melting point is above 220° C.

I have found the following cadmium alloys to be particularly suitable for this purpose: a bismuth-cadmium alloy having a bismuth content below 40% by weight; a tin-cadmium alloy having a tin content below 40% by weight; or a lead-cadmium alloy having a lead content below 82.9% by weight. If cadmium metal is used, it is recommended to use it in at least commercial grade purity.

The cadmium metal or alloy may be sprayed on or precipitated on the base plate from the vapor face.

In order to further improve the electric properties of the rectifier according to the invention, it is of advantage to add to the cadmium or cadmium alloy used for covering the base plate thallium and/or indium either in the form of metal or compounds thereof, in quantities ranging from 0.1 to 0.001% by weight.

Thereupon a selenium layer poor in halogen, and preferably substantially free from halogen, is laid upon the cadmium or the cadmium alloy at a temperature between 100 and 140° C. This layer, which can be of any desired thickness, is then subjected to a heat treatment at a temperature between 200° C. and the melting point of selenium, whereby this selenium layer is given the desired coarse crystalline structure. It is preferred to precipitate this first selenium layer from selenium vapors. It is thus possible to keep this layer very thin, thereby reducing the flow resistance of the entire system. It is of advantage to limit the thickness of this first selenium layer so that the space charge forming the physical blocking layer on the selenium side is restricted in depth to this first layer. A preferred thickness of the rectifying selenium layer is in the order of $5 \times 10^{-4}$ cm. to $5 \times 10^{-3}$ cm.

The halogen content of this selenium layer depends in the first place, on the purpose for which the finished rectifier is to be used and should not exceed $10^{15}$ halogen atoms per cm.

Due to the fact that the cadmium containing layer below this first selenium layer has a melting point well above that of selenium, the heat treatment of the selenium layer has no detrimental effects and can be carried out until the selenium layer is completely and uniformly recrystallized.

After the heat treatment of the first selenium layer is terminated, a second selenium layer, richer in halogen and/or other conductivity-augmenting impurities, is superimposed on the first selenium layer and recrystallized at a temperature between 130 and 200° C. This second selenium layer richer in halogen can either be precipitated from the vapor face in the same manner as the first layer, or it can be applied by any other known process. The second selenium layer should contain more than $10^{16}$ halogen atoms per cm.³

As in the case of the first halogen layer, the thickness of this second layer can be exactly determined as desired. Furthermore, since this second layer is heat treated at temperatures well below those at which the first selenium layer had been recrystallized, the heat treatment of this second layer does not affect the structure of the first layer nor does it cause any noticeable migration of halogen atoms from the second into the first selenium layer.

Further layers of still higher impurity content may be superimposed upon the second selenium layer and, as long as they are recrystallized at a lower temperature than the next preceding layer, a multi-selenium layer rectifier of exactly defined thickness and conductivity or blocking effect of each layer can be built up.

The step of superimposing upon these selenium layers a counter electrode which is free, or at least substantially free from blocking layers can be carried out in two preferred manners.

According to the first mode of operation, the halogen-rich selenium layer is heat treated to achieve therein the desired degree of recrystallization, whereupon a layer of bismuth selenide is precipitated thereon from the vapor face, and a final layer of bismuth is then sprayed on to the bismuth selenide layer as the second electrode.

According to the other mode of operation, a bismuth layer as the second electrode is sprayed upon the last selenium layer prior to the final heat treatment of the latter. During the subsequent heat treatment of the last selenium and the bismuth layer thereon, an intermediary layer of bismuth selenide is formed along the contact surface of both layers.

The rectifier manufactured by the method according to my invention, as illustrated in Fig. 2, comprises a base plate 1 of iron whose surface is provided with a coating 2 of nickel metal. The latter is covered by a layer 3 of a bismuth cadmium alloy and a substantially halogen-free selenium layer 5. During the first heat treatment subsequent to applying the layer 5, a cadmium-selenide intermediary layer 4 is formed between layers 5 and 3. The blocking effect of the finished rectifier occurs at the junction surface between the cadmium selenide layer 4 and the selenium layer 5. Due to the heat treatment at a temperature between 205° C. and the melting point of selenium, the layer 5 is recrystallized to adopt a very coarse structure of hexagonal crystals. The thickness of this layer is so dimensioned that the space charge forming the physical blocking layer on the selenium side does not extend beyond this layer 5, so that the superimposed selenium layer 6 which is rich in halogen, does not intervene in the rectifying effect proper. This second selenium layer 6 is of a much more fine-grained crystal structure than the layer 5, due to its lower recrystallization temperature. Due to this structure, as well as its higher impurity content, its total resistance is lower than that of layer 5, in spite of the fact that the thickness of layer 6 is preferably greater.

Between the selenium layer 6 and the counter electrode 8 of bismuth, there is present a bismuth selenide layer 7 which assures a transition to this electrode 8 which is substantially free from blocking layers.

The bismuth selenide layer 7 is either applied in a separate step following the heat treatment of layer 6, or it is formed by a reaction between the layer 6 and the bismuth layer 8 if the latter was applied prior to the heat treatment of layer 6, and both layers 6 and 8 were subjected simultaneously to a final heat treatment in the manner already described.

The advantages of the method according to my invention can thus be summarized to reside in the fact that only that portion of the selenium layers which is to participate directly in the blocking effect, is recrystallized to form particularly large crystals during the heat treatment at temperatures above 205° C., wherefore this layer can be made particularly thin and exactly dimensioned, while formerly the thickness of this layer had to be left more or less to chance. Consequently, the flow resistance in the entire selenium layer is not unnecessarily increased by the heat treatment. The remaining selenium layers making up this entire layer can be applied and heat treated independently of the rectifying layer without influencing the properties of the latter. In addition, the different halogen contents of the various selenium layers are not disturbed by the different heat treatments of these layers. Thus, the method according to the invention makes it possible to manufacture rectifiers of particularly favorable current flow and blocking properties.

It will be understood that this invention is susceptible to modification in order to adapt it to different usages and conditions, and, accordingly, it is desired to comprehend such modifications within this invention as may fall within the scope of the appended claims.

What is claimed is:

1. A method for manufacturing selenium rectifiers having at least two successively disposed selenium layers of different impurity content predominantly of halogen atoms, comprising the steps of applying a layer of cadmium containing material having a melting point above 220° C. to a metallic base plate, applying upon said cadmium-containing layer a substantially halogen-free first selenium layer at a temperature between 100 and 140° C., subjecting said first selenium layer to a heat treatment at a temperature between 205° C. and the melting point of selenium, thereupon applying a second selenium layer richer in halogen content than said first layer to the latter, subjecting said second selenium layer to a heat treatment at temperatures between 130 and 200° C., and finally applying an electrode of a material substantially free of barrier layers to said second selenium layer.

2. A method according to claim 1, characterized in that said base plate consists of a material of good conductivity for heat and electricity, which material is selected from the group consisting of aluminum, nickel, and nickel-coated metals.

3. A method according to claim 1, characterized in that said cadmium-containing material is a bismuth-cadmium alloy containing less than 40% by weight of bismuth.

4. A method according to claim 1, characterized in that said cadmium-containing material is a tin-cadmium alloy containing less than 40% by weight of tin.

5. A method according to claim 1, characterized in that said cadmium-containing material is a lead-cadmium alloy containing less than 82.5% by weight of lead.

6. A method as described in claim 1, characterized in that said cadmium-containing material is cadmium metal of at least commercial grade purity.

7. A method according to claim 1, characterized in that said cadmium-containing material is sprayed on to said base plate.

8. A method according to claim 1, characterized in that said cadmium-containing material is deposited on said base plate from the vapor phase.

9. A method according to claim 1, characterized in that said cadmium-containing material contains from 0.1 to 0.001% by weight of a substance selected from the group consisting of thallium metal, indium metal, and thallium and indium compounds.

10. A method as described in claim 1, characterized in that said first selenium layer contains less than $5.10^{15}$ halogen atoms per cm.$^3$.

11. A method as described in claim 1, characterized in that said second selenium layer contains more than $10^{16}$ halogen atoms per cm.$^3$.

12. A method according to claim 1, characterized in that at least said first selenium layer is precipitated from the vapor phase on to said layer of cadmium-containing material.

13. A method as described in claim 1, characterized in that said first selenium layer is precipitated from the vapor phase on to said layer of cadmium-containing material while said second selenium layer is deposited by a different conventional method on said first layer.

14. A method as described in claim 1, characterized in that on to said second selenium layer subsequently to said heat treatment thereof there is precipitated from the vapor phase a layer of bismuth selenide, whereupon an electrode of bismuth metal is sprayed on to said bismuth selenide layer.

15. A method according to claim 1, characterized in that an electrode of bismuth is sprayed on to said second selenium layer prior to the heat treatment of the latter.

16. In a method for making selenium rectifiers, the steps of superimposing at least two selenium layers of different impurity content predominantly of halogen atoms, upon each other and subsequently heat treating said layers while maintaining their respective impurity contents substantially undisturbed, by providing first the selenium layer of lowest impurity content and heat treating the same at a temperature between 205° C. and the melting point of selenium, and subsequently imposing thereon selenium layers of successively increased impurity content, and heat-treating each such layer at a successively lower temperature between 130 and 200° C.

17. A selenium rectifier comprising, in successive arrangement, a metal base plate, a layer of cadmium-containing material, a cadmium selenide layer, a first selenium layer substantially free from halogen atoms, a second selenium layer richer in halogen atoms than said first layer, a bismuth selenide layer and a bismuth electrode.

References Cited in the file of this patent

UNITED STATES PATENTS

| 2,316,905 | Waibel et al. | Apr. 20, 1943 |
| 2,334,554 | Hewlett | Nov. 16, 1943 |